US009992618B2

(12) United States Patent
Hundemer

(10) Patent No.: US 9,992,618 B2
(45) Date of Patent: *Jun. 5, 2018

(54) SYSTEMS AND METHODS FOR USING CALLER DATA TO SET AN OPERATIONAL MODE OF A PHONE SWITCH

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/682,014

(22) Filed: Aug. 21, 2017

(65) Prior Publication Data

US 2017/0353828 A1    Dec. 7, 2017

Related U.S. Application Data

(63) Continuation of application No. 14/286,327, filed on May 23, 2014, which is a continuation-in-part of application No. 13/970,297, filed on Aug. 19, 2013, now Pat. No. 8,761,366, which is a continuation of application No. 13/691,294, filed on Nov. 30, 2012, now Pat. No. 8,537,998.

(51) Int. Cl.
| | | |
|---|---|---|
| *H04M 3/42* | (2006.01) | |
| *H04W 4/02* | (2018.01) | |
| *H04M 3/533* | (2006.01) | |
| *G06Q 10/00* | (2012.01) | |
| *G06Q 10/10* | (2012.01) | |

(52) U.S. Cl.
CPC .............. *H04W 4/02* (2013.01); *G06Q 10/00* (2013.01); *G06Q 10/10* (2013.01); *H04M 3/53375* (2013.01); *H04M 2242/02* (2013.01)

(58) Field of Classification Search
CPC ......... H04M 2242/00; H04M 3/42348; H04M 3/42365; H04M 2203/205; H04M 3/42
USPC .............. 379/207.02, 142.01, 142.1, 142.04, 379/201.01, 201.07, 201.08, 207.15, 379/207.12, 207.03; 707/732; 340/506, 340/301; 370/352
See application file for complete search history.

(56) References Cited

U.S. PATENT DOCUMENTS

| | | |
|---|---|---|
| 6,542,733 B1 | 4/2003 | Dennis |
| 7,961,110 B2 | 6/2011 | Lemmon |
| 8,149,823 B2 | 4/2012 | Turcan et al. |
| 2007/0096894 A1 | 5/2007 | Lemmon |

(Continued)

*Primary Examiner* — Thjuan K Addy
(74) *Attorney, Agent, or Firm* — McDonnell Boehnen Hulbert & Berghoff LLP

(57) ABSTRACT

Systems and methods for using caller data to add a phone number to an outbound-call list. In one aspect, a method involves (i) a device receiving caller data corresponding to a phone call sent by a phone switch to a phone terminal; (ii) retrieving a school record corresponding to the received caller data; (iii) making a determination that the school record is associated with a type of operational status; and (iv) responsive to making the determination that the school record is associated with the type of operational status, setting an operational mode of the phone switch, wherein in the operational mode, the phone switch refrains from sending any phone calls to the phone terminal.

20 Claims, 8 Drawing Sheets

(56) References Cited

U.S. PATENT DOCUMENTS

2009/0274141 A1* 11/2009 Kanai ................ H04L 29/1216
                                                          370/352
2010/0076968 A1    3/2010 Boyns et al.
2016/0057705 A1    2/2016 Schaade et al.

* cited by examiner

SYSTEMS AND METHODS FOR USING CALLER DATA TO SET AN OPERATIONAL MODE OF A PHONE SWITCH

REFERENCE TO RELATED APPLICATION

This disclosure is a continuation of U.S. patent application Ser. No. 14/286,327 filed May 23, 2014, which is a continuation-in-part of U.S. patent application Ser. No. 13/970,297 (now U.S. Pat. No. 8,761,366) filed Aug. 19, 2013, which is a continuation of U.S. patent application Ser. No. 13/691,294 (now U.S. Pat. No. 8,537,998) filed Nov. 30, 2012.

USAGE AND TERMINOLOGY

Throughout this application, unless otherwise specified or unless the context clearly dictates otherwise, "a" or "an" is meant to read as "at least one," and "the" is meant to read as "the at least one."

TECHNICAL FIELD

The disclosed systems and methods relate generally to phone and broadcasting technologies.

BACKGROUND

A location-based organization (LBO) is an organization that generally operates out of a physical location, and that generally relies on the presence of people at that location to facilitate its operation. At any given time, an LBO has an operational status such as open or closed. When an LBO is open, the LBO generally expects select people to travel to and attend the LBO to facilitate its operation. When an LBO is closed, the LBO generally does not expect, and may even discourage people from traveling to and attending the LBO. Typically, an LBO maintains a schedule indicating when the LBO is expected to be open or closed. However, in some instances the LBO may decide to deviate from this schedule and change its operational status with little or no notice.

An example of an LBO is a school. Generally, a school relies on the presence of staff and students to facilitate its operation of educating students. Typically, a school maintains a schedule indicating on which days the school is expected to be open (commonly referred to as "school days"), and on which days the school is expected to be closed. As such, on any given school day, most of the school's staff and students are likely to travel to and attend the school. However, as discussed above, in some instances, a school may deviate from its schedule. For example, in response to weather conditions (e.g., a severe snowstorm), as a safety precaution the school may close on a day that it was otherwise expected to be open. The school may then cause dissemination of a message, which indicates the school's closed operational-status. The school may cause the message to be disseminated with the intent that targeted recipients (e.g., the staff and students) receive the message and as a result, refrain from traveling to the school. For example, the school may initiate a phone tree to disseminate the message or may provide the closed operational-status to a news organization that may in turn, disseminate such a message, such as via television-broadcast.

SUMMARY

In one aspect, a method involves (i) a device receiving caller data corresponding to a phone call sent by a phone switch to a phone terminal; (ii) retrieving a school record corresponding to the received caller data; (iii) making a determination that the school record is associated with a type of operational status; and (iv) responsive to making the determination that the school record is associated with the type of operational status, setting an operational mode of the phone switch, wherein in the operational mode, the phone switch refrains from sending any phone calls to the phone terminal.

In another aspect, a method involves (i) receiving caller data corresponding to a phone call sent by a phone switch to a phone terminal; (ii) retrieving an LBO record corresponding to the received caller data; (iii) making a determination that the LBO record is associated with a type of operational status; and (iv) responsive to making the determination that the LBO record is associated with the type of operational status, setting an operational mode of the phone switch, wherein in the operational mode, the phone switch refrains from sending any phone calls to the phone terminal.

In another aspect, a device includes a communication interface, a processor; and a non-transitory computer-readable storage medium, having stored thereon program instructions that, upon execution by the processor, cause the device to perform a set of functions. The set includes (i) receiving, via the communication interface, caller data corresponding to a phone call sent by a phone switch to a phone terminal; (ii) retrieving an LBO record corresponding to the received caller data; (iii) making a determination that the LBO record is associated with a type of operational status; and (iv) responsive to making the determination that the LBO record is associated with the type of operational status, setting an operational mode of the phone switch, wherein in the operational mode, the phone switch refrains from sending any phone calls to the phone terminal.

DETAILED DESCRIPTION OF THE DRAWINGS

I. Overview

Figure 1:
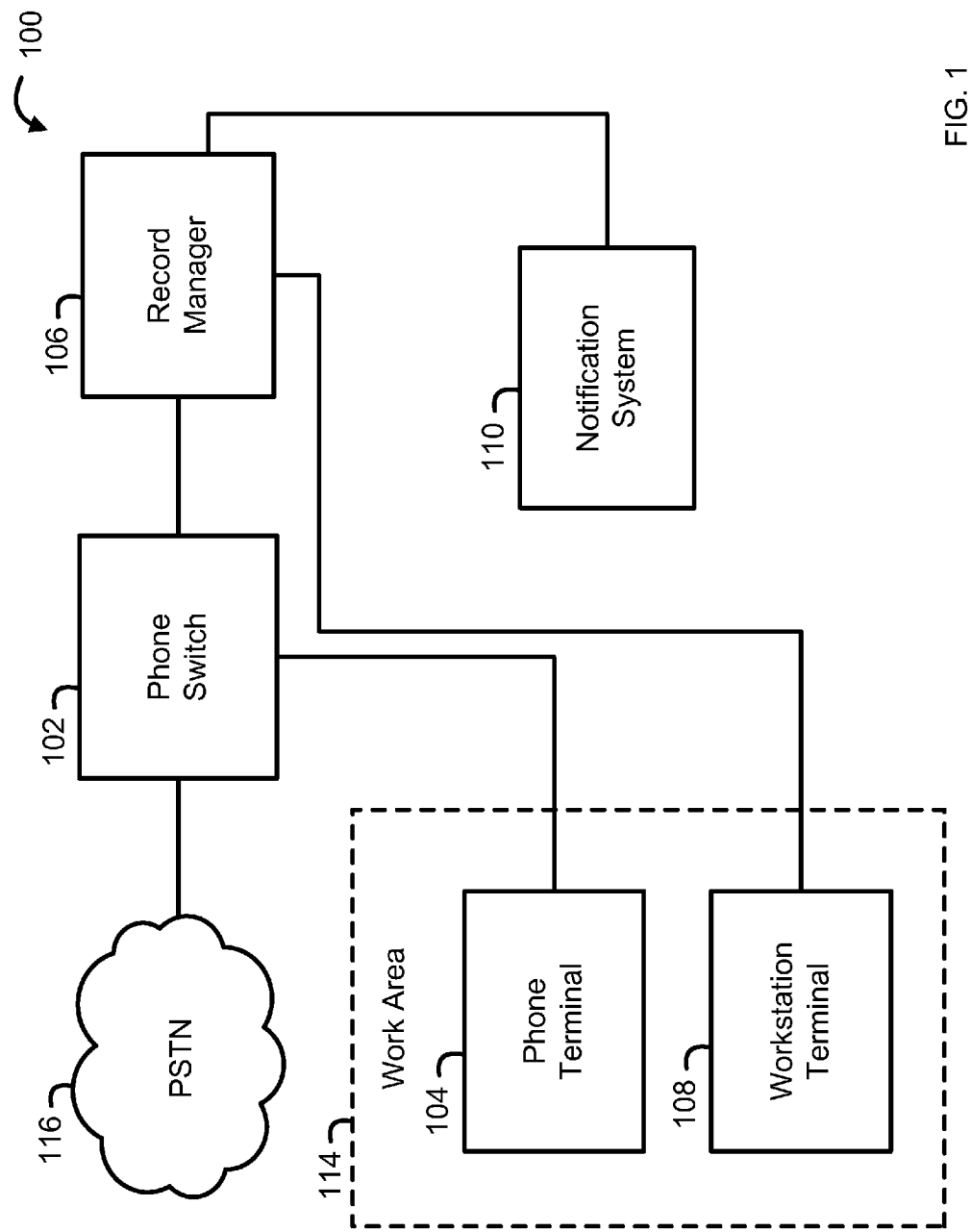
FIG. 1 is a simplified block diagram of an example system.

A school may face a challenging decision in deciding whether to close in response to weather conditions. On one hand, the school has an interest in remaining open to facilitate its operation of educating students. However, on the other hand the school has an interest in promoting the safety of the people who must travel to the school and be exposed to the weather conditions. As such, a school's closing decision involves the balancing of competing interests, and may rely in large part on the nature and/or severity of the weather conditions.

Since weather conditions constantly change, a school may continually monitor such conditions and wait to make a closing decision until shortly before the scheduled start time of the corresponding school day. Particularly in these instances, the school has an interest in quickly and effectively disseminating a message indicating that the school is closed so that the intended recipients may receive the message before traveling to the school.

Historical data of school-closing activity suggests that in some instances, one school may close only after another school has closed. For example, where a private school and a public school are located within the same geographic region (e.g., within the public school's district), in many instances the private school closes only after the public school closes. One potential explanation for such a link is that a public school is more likely to have a bus service as compared to a private school, and therefore the public school may be more focused on how weather conditions affect the roads. Accordingly, a private school may often defer and/or give weight to the public school's decision.

Given the potential public and private school link described above, a private school may have an interest in quickly receiving a message indicating that the public school is closed such that the private school can itself make a closing decision and cause dissemination of its own message.

As noted above, one way in which a school may cause dissemination of a message indicating that the school is closed is with the assistance of a news organization. In this instance, a person who is authorized to change the operational status of the school (referred to herein as a "school administrator"), such as a principle or superintendent, may make a phone call to a designated recipient (referred to herein as an "operator") at the news organization, and provide the operator with the school's closed operational-status. The operator may then store the closed operational status in a computing-device via a user interface. In response, a notification system connected to the computing-device may send a message with the operational status of the school to a list of subscribers via email or text message. The notification system may also publish the message on a website. Further in response, the notification system may overlay the message on video being broadcast. Such an overlayed message is commonly referred to as a news ticker or crawl and may, for instance, be used in connection with a television news show.

A news organization also has an interest in disseminating such messages quickly and effectively so as to gain a reputation from the public that the news organization is a reliable source for important, breaking news. Indeed, as with any type of news or related content, a news organization may obtain a competitive edge over another news organization by being the first to disseminate the message.

Schools and news organizations also have an interest in ensuring that a message indicating that a school is closed is disseminated only when properly authorized. Once the message is disseminated to the public, as a practical matter its effect is virtually irreversible. Indeed, once an intended recipient receives the message, that person is likely to make and stick with a decision not to go to the school that day, regardless of whether the school is actually closed. While the school may subsequently disseminate a correction message, the intended recipient may not receive it and/or may simply ignore it given the perceived reasonable reliance on the original message.

An unauthorized dissemination of a message indicating that a school is closed may occur for a variety of reasons. For example, a student may impersonate an administrator of his school, and may call a news organization to improperly indicate a closed operational-status. As another example, if a news organization uses a computing-device to manage the dissemination of messages, a student may infiltrate that system and again improperly cause disseminated of a message. The use of technology to falsify information such as this is often referred to as spoofing.

The disclosed systems and methods address at least some of the issues discussed above. In one example, two school records are linked together to indicate that the closing of a first school may trigger the closing of a second school. A record manager retrieves a first school-record, and then based on the link, the record manager retrieves a second school-record. Responsive to the record manager making a determination that the first school has closed (e.g., based on a call from an administrator of the first school to an operator), the record manager causes an administrator phone-number corresponding to the second school-record to be added to an outbound-call list of a workstation terminal that is used by the operator. Therefore, in response to the first school closing, the operator may proactively call an administrator of the second school, inform the administrator that the first school has closed, and determine whether the second school would also like to close. If the second school closes, a notification system may immediately disseminate a message indicating the same. Among other things, this example assists school administrators with making school closing decisions, and further helps to quickly disseminate messages indicating those decisions.

II. Example Systems

FIG. 1 shows an example system 100. The system may include several devices, including for example a phone switch 102, a phone terminal 104, a record manager 106, a workstation terminal 108, and a notification system 110.

A. Phone Switch

Generally, the phone switch 102 may function to receive a phone call from one device and send the phone call to another device. The phone switch 102 may also provide additional functionality, such as that described in greater detail below.

Figure 2:
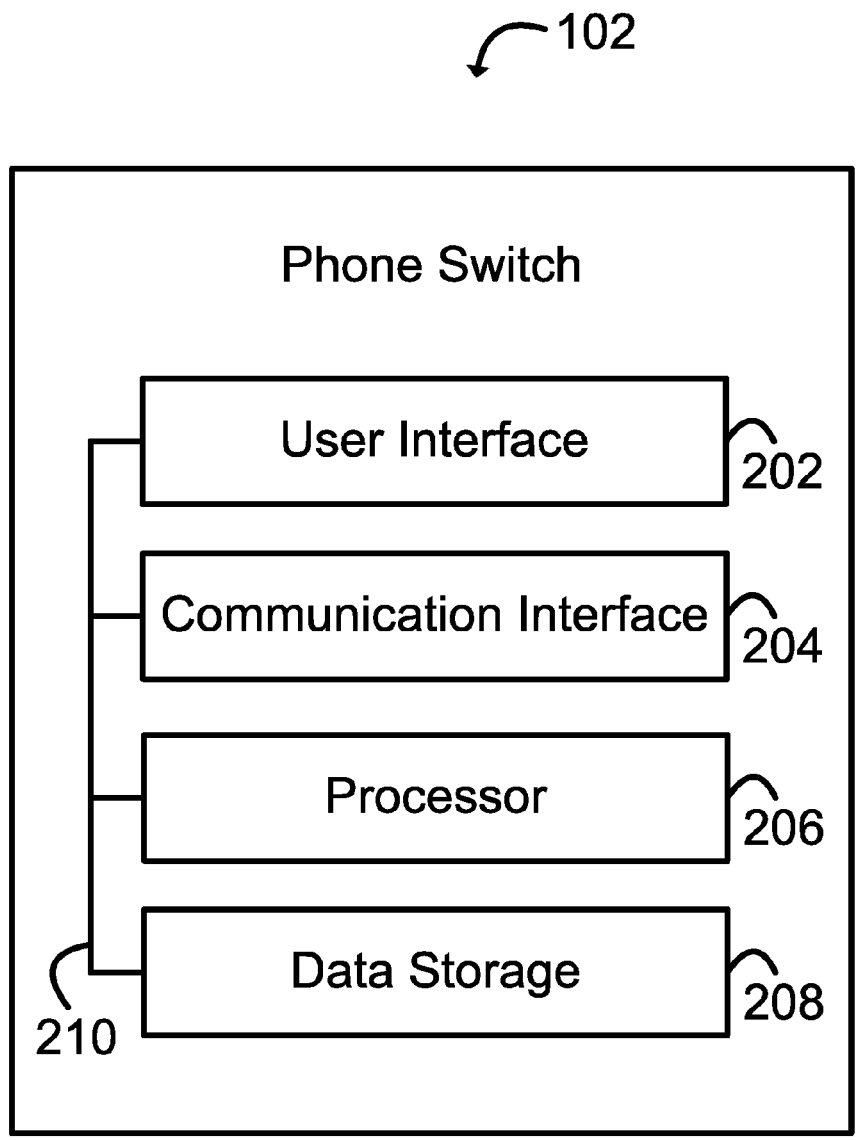
FIG. 2 is a simplified block diagram of an example phone switch of the system of FIG. 1.

FIG. 2 is a block diagram showing example components of the phone switch 102. The phone switch 102 may include a user interface 202, a communication interface 204, a processor 206, and a data storage 208, all of which may be electronically connected to each other via a system bus 210 or other connection mechanism.

The user interface 202 may function to allow the phone switch 102 to interact with a user, such as to receive input from the user or to provide output to the user. The user interface 202 may include input components such as a microphone, keyboard, touch-sensitive or presence-sensitive panel, computer mouse, or trackball. The user interface 202 may also include output components such as a display screen (which, for example, may be integrated with a presence-sensitive panel) or a speaker.

The communication interface 204 may function to allow the phone switch 102 to connect and communicate with other networks and/or devices. The communication interface 204 may include a wired interface or a wireless interface. The wired interface may take various forms, including for example a T1 (also known as a DS1) interface and/or an Ethernet interface. Likewise, the wireless interface may take various forms, including for example, a wireless wide area network (WWAN) interface (e.g., based on the long-term evolution (LTE) protocol), or a wireless local area network (WLAN) interface (e.g., based on the Wi-Fi protocol). Each wireless interface includes a corresponding antenna.

The processor 206 may function to execute program instructions. The processor may include a general purpose processor (e.g., a microprocessor) and/or a special purpose processor (e.g., a digital signal processor (DSP) or an application specific integrated circuit (ASIC)).

The data storage 208 may function to store program instructions and/or other data. The data storage 208 may include a volatile, non-volatile, removable, and/or non-removable storage component, such as magnetic, optical, flash, or organic storage, and may be integrated in whole or in part with processor 206. The data storage 208 may include a non-transitory computer-readable storage medium, having stored thereon program instructions that, upon execution by the processor 206, cause the phone switch 202 or another device to perform any of the set of functions disclosed herein and/or shown in the accompanying drawings. As such, the phone switch 202 may be configured to perform any of such functions. Program instructions may take various forms, including for example, compiled or non-compiled program logic and/or machine code.

An example phone switch is the Switchvox 355 utilizing the Asterisk software framework, both provided by Digium, Inc. of Huntsville, Ala.

B. Phone Terminal

Generally, the phone terminal 104 may function to receive and answer a phone call for use by an operator, thereby causing the phone call to become active. Generally, the phone terminal 104 may also function to initiate and send a phone call. The phone terminal 104 may also provide additional functionality, such as that described in greater detail below.

As with the phone switch 102, the phone terminal 104 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the phone terminal 104 rather than the phone switch 102.

The phone terminal 104 may take the form of an analog or a digital phone, including for example, a so-called "soft" or "hard" voice over Internet protocol (VOIP) phone, or any other type of communication device configured for use with the phone switch 102. An example phone terminal is the Digium D70 phone provided by Digium, Inc. of Huntsville, Ala.

C. Record Manager

Generally, the record manager 106 may function to receive caller data and retrieve data based on the received caller data. The record manager 106 may also provide additional functionality, such as that described in greater detail below.

Figure 3:
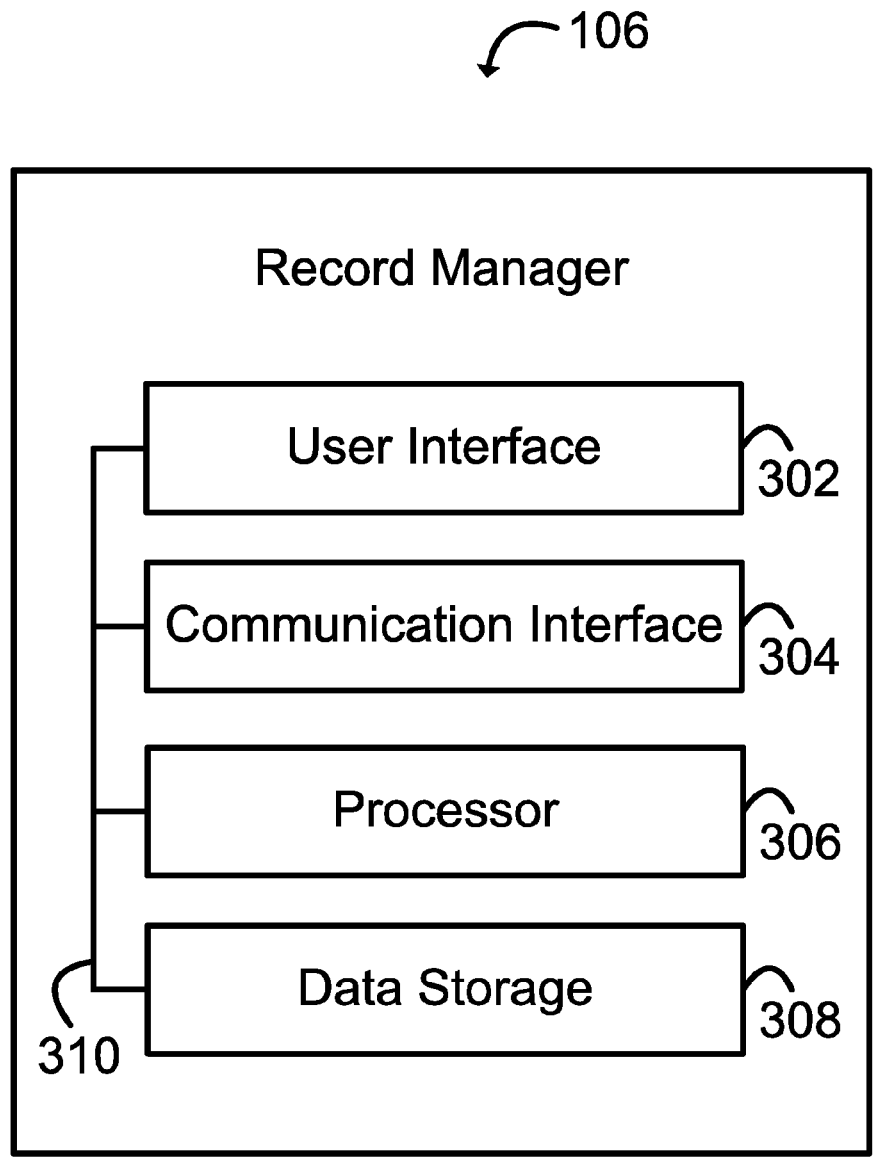
FIG. 3 is a simplified block diagram of an example record manager of the system of FIG. 1.
Figure 4A:
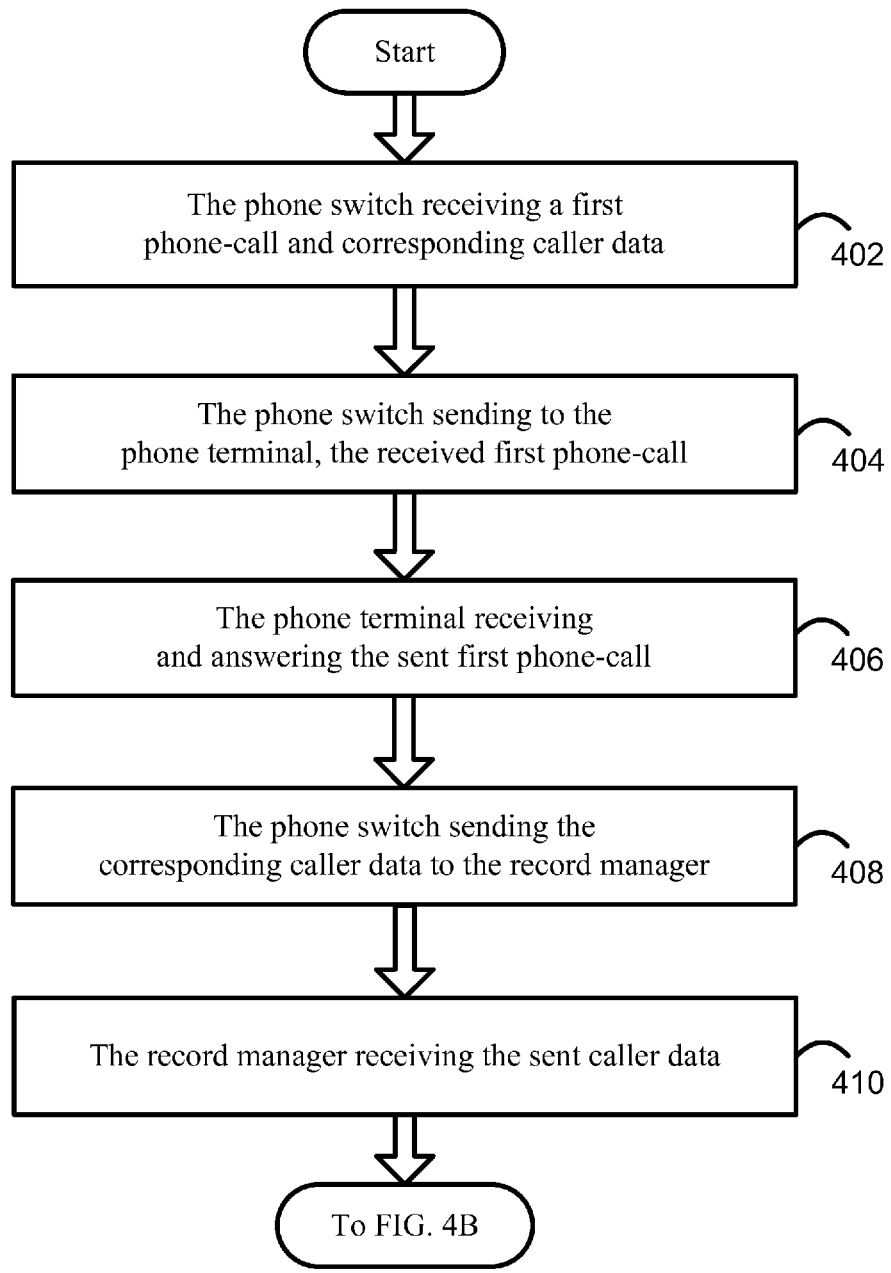
FIG. 4A shows a first part of a flow chart illustrating functions in accordance with an example method.
Figure 4B:
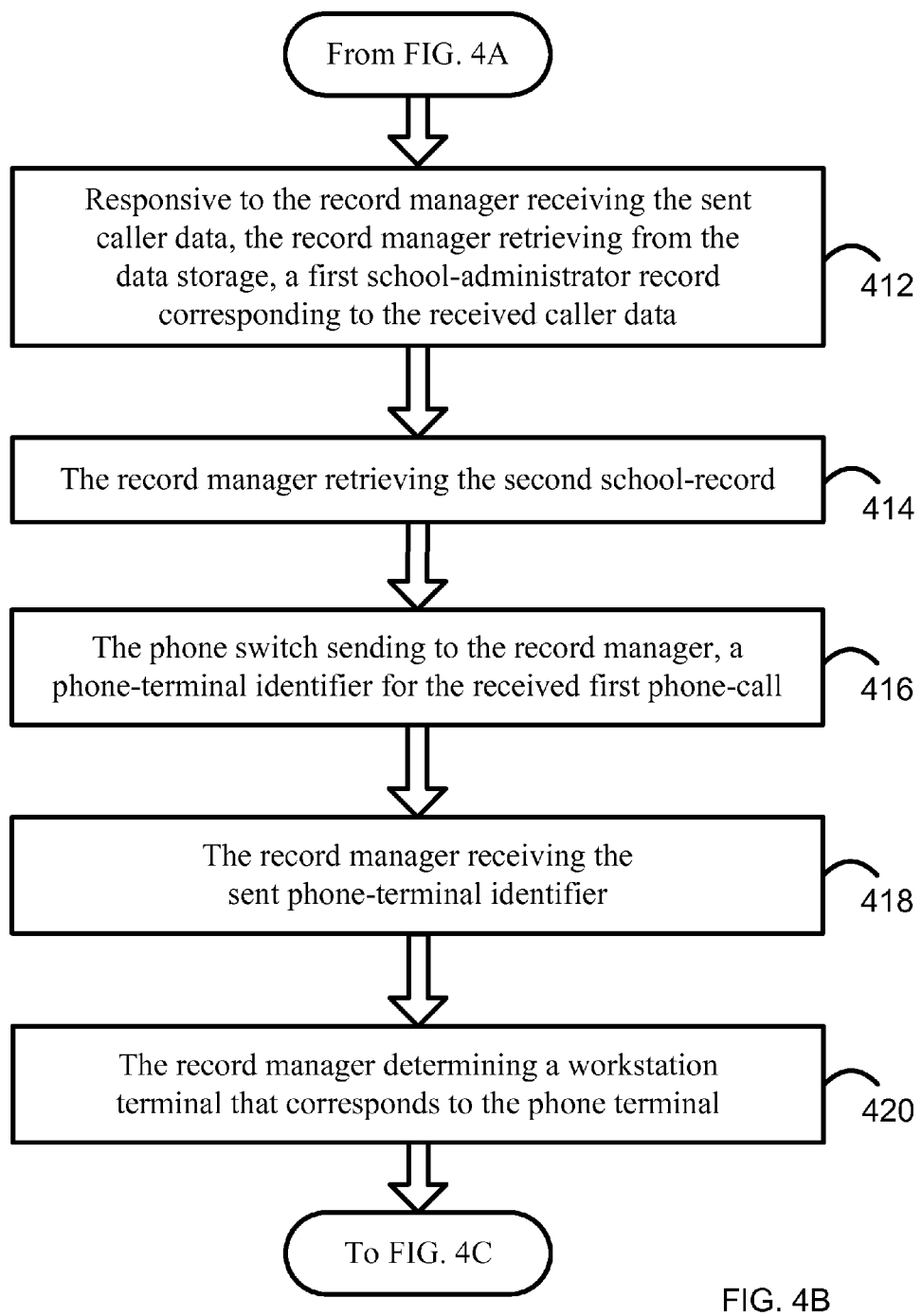
FIG. 4B shows a second part of the flow chart of FIG. 4A.
Figure 4C:
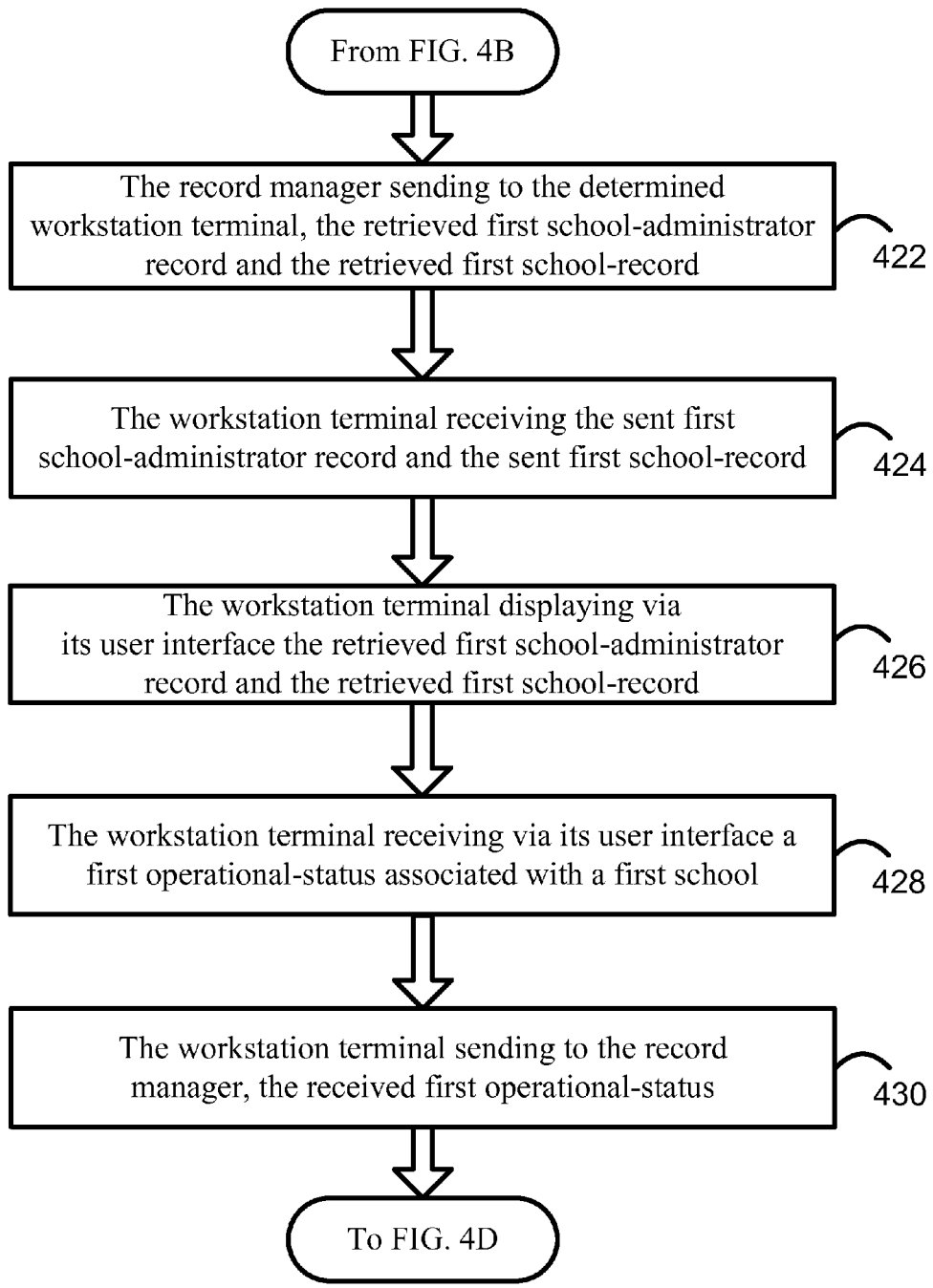
FIG. 4C shows a third part of the flow chart of FIG. 4A.
Figure 4D:
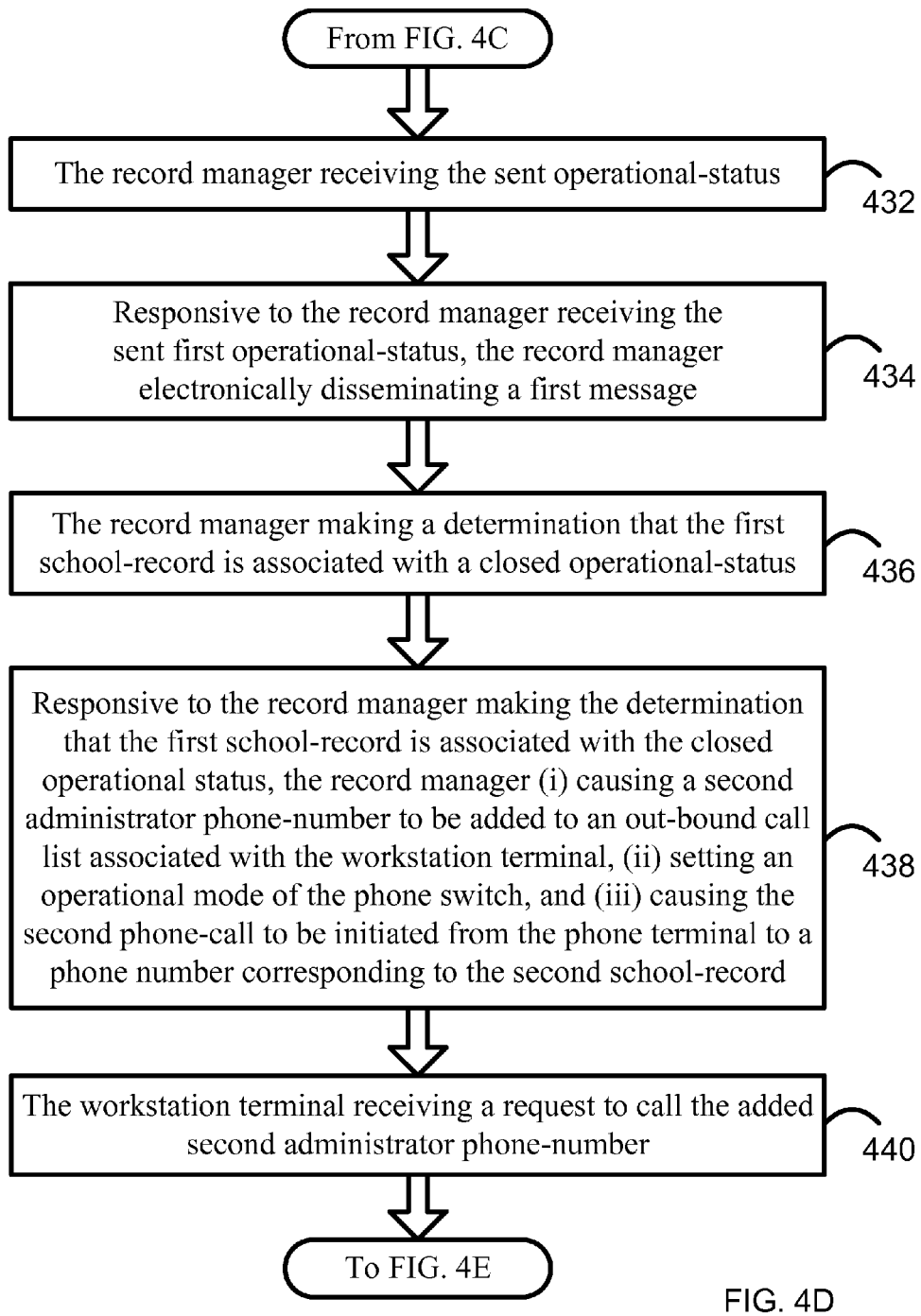
FIG. 4D shows a fourth part of the flow chart of FIG. 4A.
Figure 4E:
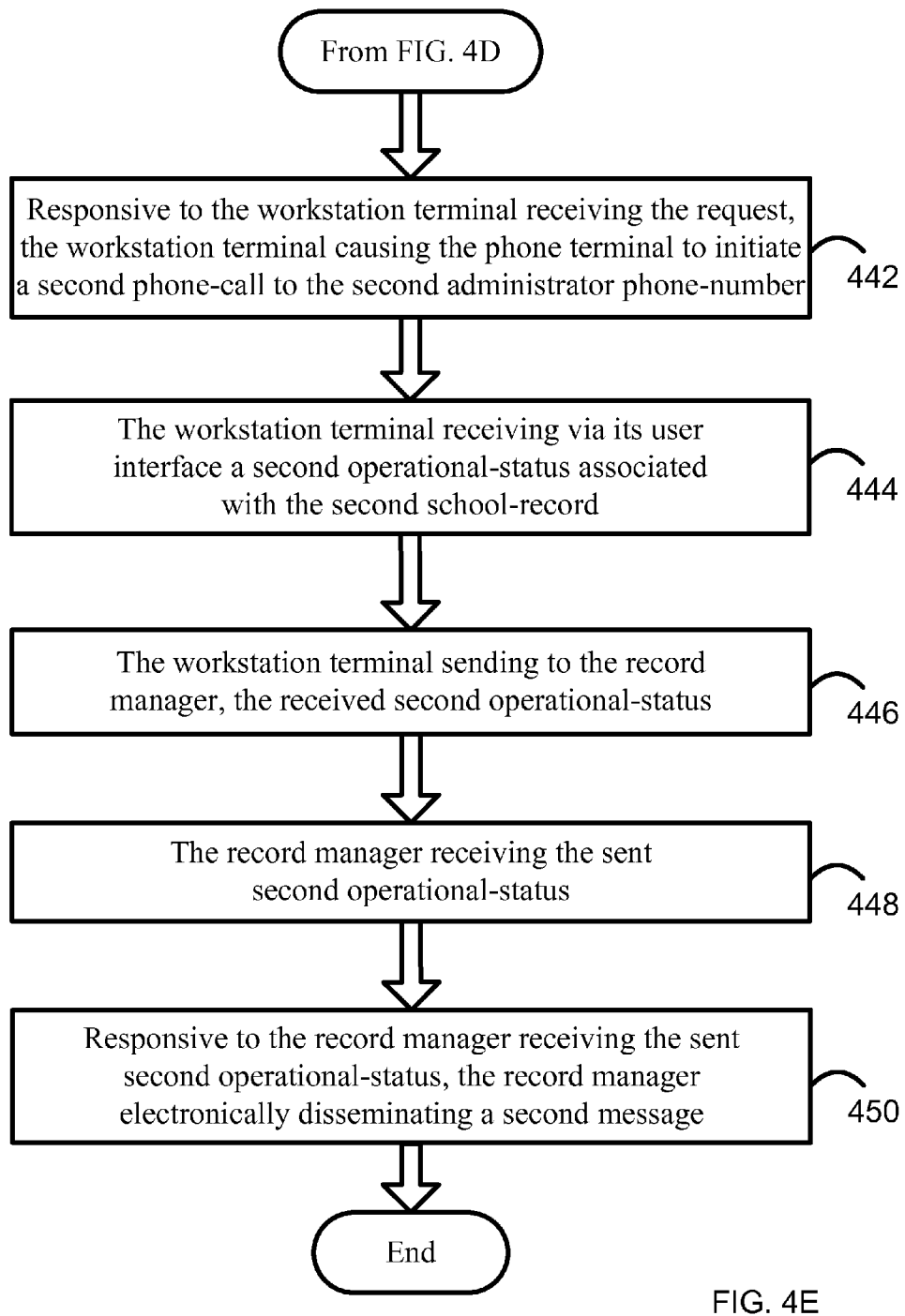
FIG. 4E shows a fifth part of the flow chart of FIG. 4A.

FIG. 3 is a block diagram showing example components of the record manager 106. As with the phone switch 102, the record manager 106 may include a user interface 302, a communication interface 304, a processor 306, and a data storage 308, all of which may be electronically connected to each other via a system bus 310 or other connection mechanism. Each of these components may be configured to provide functionality similar to that described above in connection with the phone switch 102, except with the functionality corresponding to the record manager 106 rather than the phone switch 102.

In one example, the data storage 308 may include a package of hardware and/or software components to implement functionality of the record manager 106, and may include an operating system (e.g., a Windows operating system provided by Microsoft Corporation in Redmond, Wash.), a web server (the Apache HTTP server provided by the Apache Software Foundation of Los Angeles, Calif.), a database (e.g., MySQL provided by Oracle of Redwood Shores, Calif.), and a set of program instructions in the form of scripts based on a scripting language (e.g., the PHP language).

D. Workstation Terminal

Generally, the workstation terminal 108 may function to provide and receive data from a user. The workstation terminal 108 may also provide additional functionality, such as that described in greater detail below.

As with the phone switch 102, the workstation terminal 108 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the workstation terminal 108 rather than the phone switch 102.

In one example, the phone terminal 104 and the workstation terminal 108 may be physically arranged proximate to each other, such as in an office or another work area 114 (e.g., at a news organization) where a single operator may use both the phone terminal 104 and the workstation terminal 108 in unison. For example, this arrangement may allow a user to talk on an active phone call while viewing data via a user interface of the workstation terminal 108. In one example, the workstation terminal 108 may take the form of a desktop or laptop computer.

E. Notification System

Generally, the notification system 110 may function to electronically disseminate messages. For example, the notification system may send a message as an email or a short message service (SMS) text message to a list of subscribers. As another example, the notification system 110 may publish the message on a website. As yet another example, the notification system 110 may overlay the message on video being broadcast. The notification system 110 may also provide additional functionality, such as that described in greater detail below.

As with the phone switch 102, the notification system 110 may include a user interface, a communication interface, a processor, and a data storage, all of which may be electronically connected to each other via a system bus or other connection mechanism. Each of these components may be configured to provide functionality similar to that described above in connection with the phone switch 102, except with the functionality corresponding to the notification system 110 rather than the phone switch 102.

In some instances, such as where the notification system 110 is configured to overlay a message on video being broadcast, the notification system may include additional components. For example, the notification system 110 may include a character generator such as the Viz engine provided by Vizrt in Bergen, Norway, or the ChannelBox2 provided by Chyron Corporation.

F. Network and/or Device Connections

As discussed above, each of the devices in the system 100 may include a communication interface for connecting and communicating with other networks and/or devices. As shown in FIG. 1, the phone switch 102 may be connected, such as via a T1 interface to the public-switched telephone network (PSTN) 116. A T1 interfaces may provide for a T1 connection that supports 24 voice channels (each for a different phone call), and a data channel (commonly referred to as a "D-channel") that includes corresponding caller data, among other things, as described in greater detail below.

The phone switch 102 may also be connected to the phone terminal 104 and to the record manager 106, in each instance via respective Ethernet interfaces. Similarly, the record manager 106 may be connected to the workstation terminal 108, and the notification system 110, again in each instance via respective Ethernet interfaces. However, other types of communication interfaces and connection arrangements are possible.

G. Variations

The system 100 described above is just one example of the disclosed systems. Indeed, variations to the system 100 are possible as the described components and devices may be arranged and/or configured in a variety of ways. For example, the phone terminal 104 may take the form of a "soft" VOIP phone that is integrated with the workstation terminal 108. As another example, the phone switch 102 and the record manager 106 may be integrated as a single device.

III. Example Methods

FIG. 4 shows a flow chart illustrating functions in accordance with an example method. At block 402, the method may involve the phone switch 102 receiving a first phone-call and corresponding caller data. The first phone-call may be one initiated by a first school-administrator (or perhaps someone impersonating a school administrator) who dials a designated phone number associated with the phone switch 102. The first phone-call may therefore be routed through the PSTN 116 to the phone switch 102, and therefore the phone switch 102 may receive the first phone-call and corresponding caller data from the PSTN 116.

Caller data functions to identify the caller of a phone call, such as by the caller's phone number. Examples of caller data include automatic number identification (ANI) data and caller identification data (commonly referred to as "called ID" data).

At block 404 the method may involve the phone switch 102 sending (i.e., transferring) to the phone terminal 104, the received first phone-call. Notably, in instances where the phone switch 102 is connected to multiple phone terminals, the phone switch 102 may determine an appropriate phone terminal to send the first phone-call to by using a priority queue, round-robin, or other determination technique.

At block 406, the method may involve the phone terminal 104 receiving and answering the sent first phone-call, thereby causing the sent first phone-call to become active. In one example, the phone terminal 104 answering the first phone-call may involve the operator lifting a handset of the phone terminal 104 or pushing a button on a user interface of the phone terminal 104. Once the first phone-call is active, it may then be terminated. In one example, terminating the first phone-call may involve the operator hanging up the handset of the phone terminal 104 or pushing a button on the user interface of the phone terminal 104.

At block 408, the method may involve the phone switch 102 sending the corresponding caller data to the record manager 106. At block 410, the method may involve the record manager 106 receiving the sent caller data. The record manager 106 may use the sent caller data to retrieve an administrator record and/or a school record.

An administrator record includes data associated with an administrator. For example, an administrator record may include (or otherwise be associated with) an administrator phone-number, administrator verification-data, and an indication of a school record (for a school that the administrator is authorized to change the operational status of).

A school record includes data associated with a school. For example, a school record may include a school identifier (e.g., a school name) and an indication of another "linked" school record.

This link between two school records represents a logical relationship between the respective schools, namely that there is a reasonable likelihood that one school will change its operational status in response to another school changing its operational status. For example, consider a public school and a private school located within the same geographic region (e.g., within the public school's district). As discussed above, in response to the public school changing its operational status to closed, the private school (with such knowledge) may be likely to change its operational status to closed as well. Such links between schools may be defined based on historical data, such as historical school-closing data as discussed above.

At block 412, the method may involve responsive to the record manager 106 receiving the sent caller data, the record manager 106 retrieving from the data storage 208, a first school-administrator record corresponding to the received caller data. As such, in response to a first school-administrator calling the designated phone number from his office or mobile phone, the record manager 106 may automatically retrieve the first school-administrator record.

In some instances a school-administrator record may include multiple indications of school records. As such, in one example when a superintendent of a public school district calls the designated phone number from his office or mobile phone, the phone server 106 may retrieve school records for all of the public schools in the superintendent's district.

The first school-administrator record may include an indication of a first school-record, which the record manager 106 may also retrieve. As such, the function at block 412 may involve responsive to the record manager 106 receiving the sent caller data, the record manager 106 retrieving from the data storage 208, a first school-record corresponding to the received caller data.

The data described above in connection with school-administrator records and school records need not be organized in the particular manner described. As such, at block 412, the method may involve the record manager 106 retrieving any of the described data (e.g., a school-administrator record, a school record, or data included therein) that corresponds to the received caller data.

The first school-record may include an indication of a second school-record. At block 414, the method may involve the record manager 106 retrieving the second school-record. In one example, the record manager 106 retrieving the second school-record may occur in response to the record manager 106 retrieving the first school-record. In another example, the record manager 106 retrieving the second school-record may occur in response to the record manager 106 receiving an operational status of a first school associated with the first school-record as described below.

At block 416, the method may involve the phone switch 102 sending to the record manager 106, a phone-terminal identifier for the received first phone call. The phone-terminal identifier indicates to which phone terminal 104 the phone switch 102 has sent (or will send) the received phone call. At block 418, the method may involve the record manager 106 receiving the sent phone-terminal identifier.

At block 420, the method may involve the record manager 106 determining a workstation terminal 108 that corresponds to the phone terminal 104. In one example, the workstation terminal 108 is determined based on the received phone-terminal identifier. A table or other data structure in the data storage 308 may provide a mapping of phone-terminal identifiers to corresponding workstation-terminal identifiers.

Recall that a school-administrator record may include administrator verification data. As noted, this may be used by an operator to verify the identity of the caller. This may be particularly beneficial in instances where a caller has spoofed the called data corresponding to the caller's phone call (e.g., where a student makes it appear as though he is calling from his principal's phone). In one example, the administrator verification data may include facts such as the names of board members for a particular school, which the operator may request that the caller confirm to verify the caller's identify. In one example, if the caller stumbles or cannot confirm such facts, the operator may attempt to call the presumed school administrator at the administrator phone-number included in the school-administrator record to verify the caller's identity.

At block 422, the method may involve the record manager 106 sending to the determined workstation terminal 108, the retrieved first school-administrator record and the retrieved first school-record. At block 424, the method may involve the workstation terminal 108 receiving the sent first school-administrator record and the sent first school-record. At block 426, the method may involve the workstation terminal 108 displaying via its user interface the received first school-administrator record and the received first school-record for use by the operator when talking to the first administrator. Displaying such data in this manner is sometimes referred to as a "screen pop."

At block 428, the method may involve the workstation terminal 108 receiving via its user interface (e.g., from the operator) a first operational-status associated with the first school (corresponding to the first school-record). This function may occur as a result of the first school-administrator providing the operational-status to the operator who in turn provides it to the workstation terminal 108 via the user interface. As discussed above, an operational-status may be open or closed. However, other types are possible. For example, a school may have an open with a delayed start time operational-status or an open with limited bus service operational-status.

At block 430, the method may involve the workstation terminal 108 sending to the record manager 106, the received first operational-status. At block 432, the method may involve the record manager 106 receiving the sent first operational-status. At block 434, the method may involve responsive to the record manager 106 receiving the sent first operational-status, the record manager 106 electronically disseminating a first message. The first message may indicate the received first operational-status associated with the first school. This indication may be explicit or implicit. For example, the second message may state that "School ABC will be closed today," or that "School ABC will open at 11:00 am today."

At block 436, the method may involve the record manager 106 making a determination that the first school-record is associated with a closed operational-status (i.e., that the first school has a closed operational-status). In one example, the record manager 106 may make the determination based on the received operational-status.

At block 438, the method may involve responsive to the record manager 106 making the determination that the first school-record is associated with the closed operational-status, the record manager 106 causing a second administrator phone-number to be added to an outbound-call list associated with the workstation terminal 108. In one example, the second administrator phone-number may be one included in a second school-administrator record that includes an indication of the second school-record. As such, the second administrator phone-number is a phone number of a second administrator who is authorized to change the operational status of the second school.

In one example, additional data (e.g., from the second school-record) may be sent to the workstation terminal 108 such that it may be displayed in connection with the outbound-call list. This may allow the operator to select a displayed school identifier and cause a phone call to be initiated to the second administrator phone-number.

At block 440, the method may involve the workstation terminal 108 receiving a request to call the added second administrator phone-number.

At block 442, the method may involve responsive to the workstation terminal 108 receiving the request, the workstation terminal causing the phone terminal 104 to initiate a second phone-call to the second administrator phone-number. In one example, the request received by the workstation terminal 108 is sent to the record manager 106, and then the phone switch 102, which causes the phone terminal 104 to initiate the call.

Therefore, as soon as the record manager 106 determines that the first school is closing, the operator is provided with an opportunity to easily initiate a second phone-call to the school-administrator of the linked second school that is likely to close as well. In the example provided above, the operator who receives the first phone-call from the first school-administrator is the same operator who calls the second school-administrator. This may provide a particular benefit in that the operator may refer to his conversation with the first school-administrator as he speaks to the second school-administrator. In some instances, this provides reassurance to the second school operator that he is justified in deciding to the close the second school.

However, in other examples a different operator (i.e., using a different phone terminal and workstation terminal) may initiate the second phone-call. Accordingly, the record manager 106 and the phone switch 102 may be configured to send data and phone calls to the other phone terminal and workstation pairs.

Notably, in the instance where the same operator receives the first phone-call and initiates the second phone-call, the record manager 106 may send a timely request to the phone switch 102 requesting that the phone terminal 104 be temporarily deemed unavailable after it terminates the first phone-call (i.e., such that the phone terminal 104 may be available to initiate the second phone-call). As such, in one example, the function at block 438 may further involve, responsive to making the determination that the first school-record is associated with the closed operational-status, the record manager 106 setting an operational mode of the phone switch 102. In this operational mode, the phone switch 102 refrains from sending any phone calls to the phone terminal 104. In addition, the function at block 438 may involve, responsive to making the determination that the school record is associated with the closed of operational-status, the record manager 106 causing the second phone-call to be initiated from the phone terminal 104 to a phone number corresponding to the second school-record (e.g., a phone number of a school administrator of the second school). In one example, the record manager 106 may cause such a phone call to be initiated by transmitting suitable instructions to the phone switch 102 and/or to the phone terminal 104.

In yet another example, the second phone-call may simply be a recorded or dynamically created message that indicates that the first school has closed and that allows the administrator to close the second school such as via a phone keypad input.

At block 444, the method may involve the workstation terminal 108 receiving via its user interface (e.g., from the operator) a second operational-status associated with the second school-record (i.e., an operational-status of the second school). At block 446, the method may involve the workstation terminal 108 sending to the record manager 106, the received second operational-status. At block 448, the method may involve the record manager 106 receiving the sent second operational-status. At block 450, the method may involve responsive to the record manager 106 receiving the sent second operational-status, the record manager 106 electronically disseminating a second message. The second may indicate the received second operational-status associated with the second school. Therefore, as with the first school, as soon as the second school decides to close, a message indicating the same may be disseminated.

IV. Example Variations

While examples have been provided in connection with a particular type of LBO, namely a school, the disclosed systems and methods are not so limited and may be adapted for use with any type of LBO, including for example, a business. Indeed, a business such as a manufacturing plant generally relies on the presence of employees to facilitate its operation of manufacturing goods. As with a school, typically a plant maintains a schedule indicating on which days the plant is expected to be open (commonly referred to as "work days"), and on which days the plant is expected to be closed. However, again, weather conditions may cause the plant to close, and therefore the plant may disseminate a message indicating that the business has closed with the intent that targeted recipients (e.g., plant employees) refrain from traveling to the manufacturing plant. As such, any of the terms used herein that have a "school" modifier may be more broadly referred to with an "LBO" modifier (e.g., a school-record may more broadly be referred to as an LBO-record).

While examples of linked schools (i.e., public and private schools) have been provided, it should be noted that schools (or other LBOs) may be linked for other reasons. In some instances schools may be linked based simply on trends found in historical data. Also, in some instances, three or more LBO records may be linked in linear fashion so as to create a cascading effect for adding administrator phone-numbers to an outbound call list. Further, while the example provided focuses on schools being associated with a closed operational status, the disclosed systems and methods are not so limited and may be adapted for use with any operational status.

While the examples provided above involve the use of caller data to retrieve corresponding school-administrator and school records, in some instances such records may be retrieved based on other data. For example, rather than a school-administrator calling the designated phone number, the school-administrator may login to a website (or other portal). Similar to the use of caller data, in one example, the record manager 106 may use login data (or other data) provided by the administrator to retrieve corresponding school-administrator and/or school records. As such, rather than the school-administrator providing an operational status of the first school to an operator over a phone call, the school-administrator may provide the operational status via the website. Accordingly, the record manager 106 may make the determination that the first school is associated with a closed operational-status based on the received login data, and therefore cause an administrator phone-number to be added to an outbound call list in the same manner as described above. As another example, the administrator may provide an operational status via an automated phone system.

While the functions have been described as being performed by the certain devices (e.g., the record manager 106), the functions may be performed by any device, such as any of those included in the system 100. Further, the functions described throughout this disclosure need not be performed in the disclosed order. Also, not all functions need to be performed to achieve the desired advantages of the disclosed systems and methods, and therefore not all functions are required (i.e., other example methods may include any subset of the functions described herein).

While select example systems and methods have been described, other changes, substitutions, alterations, and permutations will be apparent to those of ordinary skill in the art without departing from the broader aspects as set forth in the following claims.

The invention claimed is:

1. A device comprising:
   a communication interface;
   a processor; and
   a non-transitory computer readable storage medium, having stored thereon program instructions that, upon execution by the processor, cause the device to perform a set of functions comprising:
   receiving, via the communication interface, caller data corresponding to a phone call sent by a phone switch to a phone terminal;
   retrieving a school record corresponding to the received caller data;
   making a determination that the school record is associated with a type of operational status of a school; and
   responsive to making the determination that the school record is associated with the type of operational status of the school, setting an operational mode of the phone switch, wherein in the operational mode, the phone switch refrains from transferring any phone calls to the phone terminal.

2. The device of claim 1, wherein the school record is a first school-record, the first school-record is associated with a second school-record, and the phone call is a first phone-call, the set of functions further comprising:
   retrieving the second school-record; and
   responsive to making the determination that the first school-record is associated with the type of operational status of the school, causing a second phone-call to be initiated from the phone terminal to a phone number corresponding to the second school-record.

3. The device of claim 2, wherein the first school-record is associated with a public school and the second school-record is associated with a private school.

4. The device of claim 3, wherein the private school is located within a geographical district of the public school.

5. The device of claim 2, wherein retrieving the second school-record occurs in response to retrieving the first school-record.

6. The device of claim 1, wherein the caller data comprises caller identification data.

7. The device of claim 1, where the caller data comprises automatic number identification data.

8. A non-transitory computer-readable medium having stored thereon program instructions that upon execution by a processor, cause performance of a set of operations comprising:
- receiving caller data corresponding to a phone call sent by a phone switch to a phone terminal;
- retrieving a school record corresponding to the received caller data;
- making a determination that the school record is associated with a type of operational status of a school; and
- responsive to making the determination that the school record is associated with the type of operational status of the school, setting an operational mode of the phone switch, wherein in the operational mode, the phone switch refrains from transferring any phone calls to the phone terminal.

9. The non-transitory computer-readable medium of claim 8, wherein the school record is a first school-record, the first school-record is associated with a second school-record, and the phone call is a first phone-call, the set of operations further comprising:
- retrieving the second school-record; and
- responsive to making the determination that the first school-record is associated with the type of operational status of the school, causing a second phone-call to be initiated from the phone terminal to a phone number corresponding to the second school-record.

10. The non-transitory computer-readable medium of claim 9, wherein the first school-record is associated with a public school and the second school-record is associated with a private school.

11. The non-transitory computer-readable medium of claim 10, wherein the private school is located within a geographical district of the public school.

12. The non-transitory computer-readable medium of claim 9, wherein retrieving the second school-record occurs in response to retrieving the first school-record.

13. The non-transitory computer-readable medium of claim 8, wherein the caller data comprises caller identification data.

14. The non-transitory computer-readable medium of claim 8, wherein the caller data comprises automatic number identification data.

15. A non-transitory computer-readable medium having stored thereon program instructions that upon execution by a processor, cause performance of a set of operations comprising:
- receiving caller data corresponding to a phone call sent by a phone switch to a phone terminal;
- retrieving a location-based-organization-record (LBO record) corresponding to the received caller data;
- making a determination that the LBO record is associated with a type of operational status of a location-based-organization (LBO); and
- responsive to making the determination that the LBO record is associated with the type of operational status of the LBO, setting an operational mode of the phone switch, wherein in the operational mode, the phone switch refrains from transferring any phone calls to the phone terminal.

16. The non-transitory computer-readable medium of claim 15, wherein the LBO record is a first LBO-record, the first LBO-record is associated with a second LBO-record, and the phone call is a first phone-call, the set of operations further comprising:
- retrieving the second LBO-record; and
- responsive to making the determination that the first LBO-record is associated with the type of operational status of the LBO, causing a second phone-to be initiated call from the phone terminal to a phone number corresponding to the second LBO-record.

17. The non-transitory computer-readable medium of claim 16, wherein the first LBO-record is associated with a public school and the second LBO-record is associated with a private school.

18. The non-transitory computer-readable medium of claim 17, wherein the private school is located within a geographical district of the public school.

19. The non-transitory computer-readable medium of claim 16, wherein retrieving the second LBO-record occurs in response to retrieving the first LBO-record.

20. The non-transitory computer-readable medium of claim 15, wherein the caller data comprises caller identification data or automatic number identification data.

* * * * *